United States Patent
Short

[15] 3,677,584
[45] July 18, 1972

[54] TWO DIRECTION QUICK ADJUSTING BAR CLAMP

[72] Inventor: Henry O. Short, Lynchburg, Va.

[73] Assignee: Simplimatic Engineering Co., Lynchburg, Va.

[22] Filed: March 24, 1971

[21] Appl. No.: 127,567

[52] U.S. Cl. .............................................. 287/49, 287/54 B
[51] Int. Cl. ................................................................ F16b 7/04
[58] Field of Search ................. 287/54 A, 54 B, 54.1, 49, 51, 287/54 C; 248/124, 287; 24/81 CR

[56] References Cited

FOREIGN PATENTS OR APPLICATIONS

| 1,414,058 | 9/1965 | France | 287/51 |
| 1,237,907 | 6/1960 | France | 287/54 B |
| 496,969 | 12/1938 | Great Britain | 287/54 B |
| 279,031 | 2/1952 | Switzerland | 287/49 |
| 534,865 | 1/1955 | Belgium | 287/54 B |

Primary Examiner—Andrew V. Kundrat
Attorney—James and Franklin

[57] ABSTRACT

A bar clamp for quickly adjusting two bars arranged in different planes and in two different directions employing a single control device, operative for simultaneously tightening and simultaneously releasing the two bars to and from the clamp in any position of adjustment of the bars relative to each other in said two directions.

2 Claims, 3 Drawing Figures

Patented July 18, 1972 3,677,584

INVENTOR
HENRY O. SHORT
BY James F. Franklin
ATTORNEY

TWO DIRECTION QUICK ADJUSTING BAR CLAMP

This invention relates to a quick adjusting bar clamp and more particularly to a two-direction quick adjusting block type bar clamp.

Clamps for slidably adjusting bars or rods relatively to a support have been the subject of a variety of structural forms. Such clamps of the prior art typically include structures in which the adjustment of a bar is effected by a control device such as a screw member acting on the rod slidably movable in a holder such as a block, or in which a plurality such as two bars, arranged at angles to each other, are slidably movable and adjusted in a clamping device, or in which a single control device such as a screw member is employed for clamping a plurality of parts together.

The present invention has for its object the provision of a bar clamp devised for receiving two bars in different planes and arranged in different directions effective for relatively and simultaneously adjusting the bars in any position of the two bars in said different directions by means of a single control device.

To the accomplishment of the said object and such other objects as may hereinafter appear, the present invention relates to the two-direction quick adjusting bar clamp as defined in the appended claims taken together with the following specification and the accompanying drawings in which:

Figure 2:
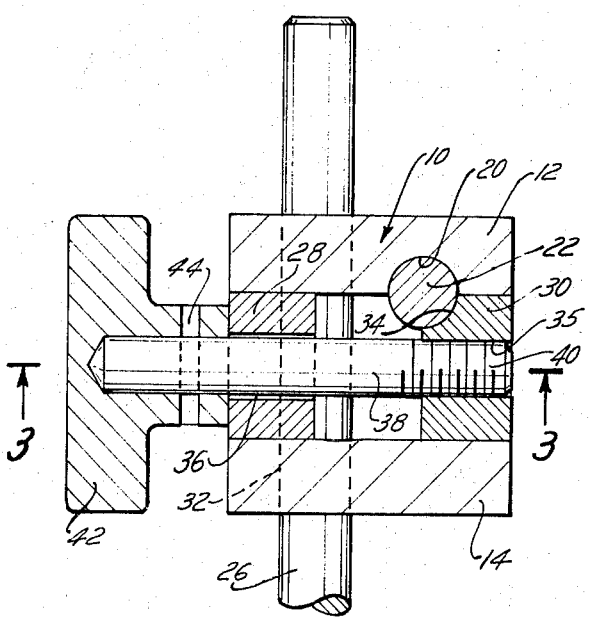
FIG. 2 is a view of the bar clamp taken in cross-section in the plane of the line 2—2 of FIG. 1.
Figure 1:
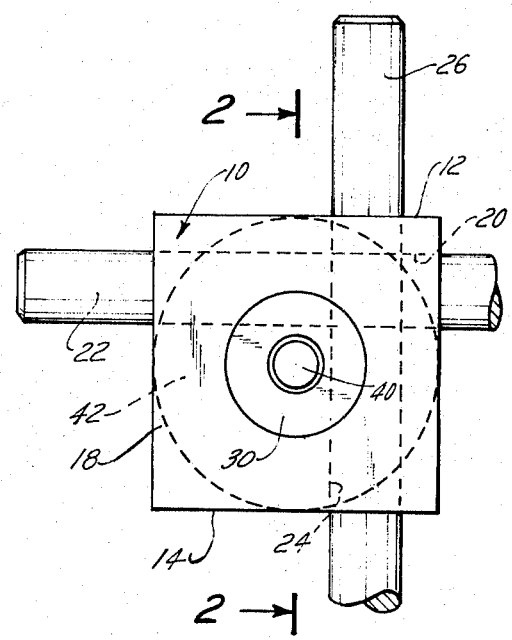
FIG. 1 is a top plan view of the two-direction quick adjusting bar clamp of the present invention in mounted combination with the two bars for which the clamp is designed.

Referring now in more detail to the drawings, the bar clamp of the invention comprises a bar holder generally designated as 10 which may be in the form of a rectangular block having the top and bottom walls 12 and 14 and the side walls 16 and 18 bored to receive two bars arranged in different planes and in two different directions, the top wall 12 being bored at 20 for receiving the bar 22 and the side wall 18 being bored at 24 for receiving the bar 26. The bars 22 and 26 are freely movable in the bores 20 and 24; and as clearly shown in the drawings the block 10 is bored to receive the bars in two different planes and arranged in two different directions. In the exemplified structure depicted in the drawings the bars are disposed at right angles in relation to each other.

In the clamp structure of the invention, the clamp holder is devised for effecting the simultaneous tightening and the simultaneous releasing of the bars to and from the clamp holder in any position of the adjustment of the bars relative to each other in the holder in either and both of the said two directions. This is accomplished by the provision of two alined members 28 and 30 mounted within the holder or block 10 freely movable in contact with the top, bottom and side walls of the holder, the member 28 being formed, for example, concavely, at 32 to engage and disengage the bar 26 to tighten and release the same in the holder, and the member 30 being formed, also for example, concavely, at 34 for engaging and disengaging the bar 22 to tighten and release the same in the holder 10.

For effecting the simultaneous tightening and releasing of the bars 22 and 26 by the members 28 and 30, the member 30 is internally threaded at 35 and the member 28 is formed with a clearance opening 36; and a single control device is employed operatively connecting the members 28 and 30 for moving these members relatively toward and from each other, said single control device comprising a rod 38 freely passing through the member 28 and threaded at its end at 40 for threaded engagement with the member 30, an end knob 42 fixed to said rod 38 by the pin 44 being arranged to releasably engage the member 28 in the rotation of the knob.

By means of this described bar clamp structure it will be seen that by the simple actuation of the control knob 42, simultaneous tightening or simultaneous releasing both bars 22 and 26 may be effected to adjustably move these bars relatively to each other in their two mounted directions to any position of either or both bars.

Figure 3:
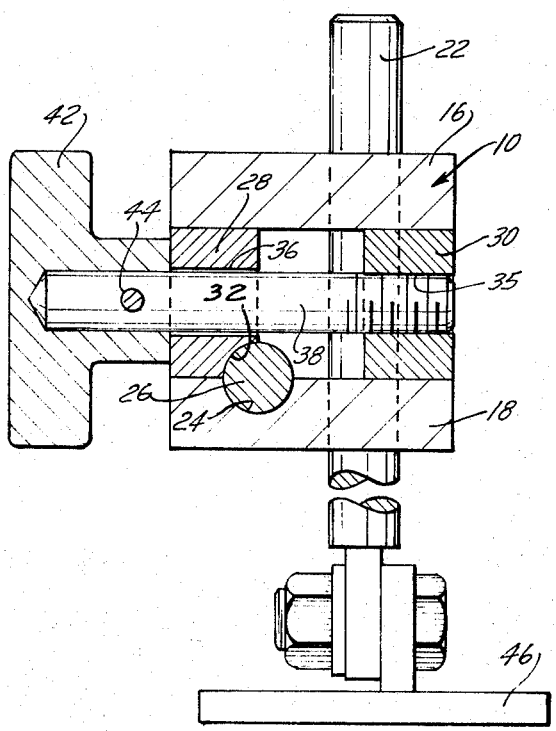
FIG. 3 is a view of the bar clamp taken in cross-section in the plane of the line 3—3 of FIG. 2, also showing one of the bars attached to a guide back-up support.

To further illustrate the operation of the bar clamp, the bar 22 is shown attached at one of its ends to a guide back-up support 46 (see FIG. 3).

The bar 26 may be a vertical post and the bar 22 may be a pusher bar, the clamp structure thereby providing a clamping control which, with one twist of the control device 42, the guide back-up support and the pusher bar 22 can be repositioned up or down and in and out with reference to the vertical post 26.

The structure, use and operation of the bar clamp of the invention, and the advantages of the use thereof will be fully apparent from the above detailed description thereof. It will be further apparent that changes may be made thereto within the description thereof without departing from its invention defined in the following claims.

I claim:

1. A two-direction quick adjusting bar clamp comprising a clamp holder block bored to provide two bores to receive two bars arranged in two different directions at right angles to each other, the bars being each freely movable along the holder block for effecting the relative adjustment of the bars in said directions, two alined members movably mounted within another bore the holder block, one member being formed to engage and disengage one of the bars to tighten and release the same in the holder and the other member being formed to engage and disengage the other of the bars to tighten and release the same in the holder, the said two alined members comprising a first member internally threaded and a second member having a clearance opening, and a single control device operatively connecting the said members for moving the members relatively toward and from each other for effecting the simultaneous tightening and the simultaneous releasing of the bars to and from the holder in any position of the adjustment of the bars relative to each other in the said two directions, the single control device comprising a rod freely passing through said second member and threadingly connected to said first member and a manually operable element fixed to said rod and arranged thereon to releasably engage said second member.

2. The adjusting bar of claim 1 in which the clamp holder block has a top wall, a bottom wall and opposite side walls, and the two alined members are freely movable in said another bore in contact therewith opposite the top, bottom and side walls of the holder block.

* * * * *